United States Patent [19]
Burge et al.

[11] Patent Number: 6,014,638
[45] Date of Patent: *Jan. 11, 2000

[54] SYSTEM FOR CUSTOMIZING COMPUTER DISPLAYS IN ACCORDANCE WITH USER PREFERENCES

[75] Inventors: Gary L. Burge, Powell; William A. Luddy, Columbus, both of Ohio

[73] Assignee: America Online, Inc., Dulles, Va.

[ * ] Notice: This patent issued on a continued prosecution application filed under 37 CFR 1.53(d), and is subject to the twenty year patent term provisions of 35 U.S.C. 154(a)(2).

[21] Appl. No.: 08/654,529

[22] Filed: May 29, 1996

[51] Int. Cl.[7] .......................... G06F 15/62; G06F 17/60; G07G 7/12
[52] U.S. Cl. ................................. 705/27; 705/26; 705/14
[58] Field of Search .................. 705/26, 14; 395/335, 395/200, 201; 463/40; 348/7; 707/2; 364/274; 235/375

[56] References Cited

U.S. PATENT DOCUMENTS

| | | | |
|---|---|---|---|
| 5,319,455 | 6/1994 | Hoarty et al. | 348/7 |
| 5,446,891 | 8/1995 | Kaplan et al. | 395/600 |
| 5,515,270 | 5/1996 | Weinblatt | 364/405 |
| 5,528,490 | 6/1996 | Hill | 364/403 |
| 5,642,484 | 6/1997 | Harrison, III et al. | 395/214 |
| 5,710,884 | 1/1998 | Dedrick | 395/200.47 |
| 5,710,887 | 1/1998 | Chelliah et al. | 395/226 |
| 5,724,521 | 3/1998 | Dedrick | 395/226 |
| 5,727,048 | 3/1998 | Hiroshima et al. | 379/93.12 |
| 5,729,693 | 3/1998 | Holda-Fleck | 395/214 |
| 5,740,549 | 4/1998 | Reilly et al. | 705/14 |
| 5,745,882 | 4/1998 | Bixler et al. | 705/26 |
| 5,754,939 | 5/1998 | Herz et al. | 455/4.2 |
| 5,756,280 | 5/1998 | Soora et al. | 455/4.2 |

OTHER PUBLICATIONS

Debra Aho Williamson, Smart agents build brains into Net ads, Advertising Age, p. 26, Apr. 8, 1996.
Ken Kerrigan, Interactive Imaginations breaaks new ground with unique Internet entertainment site, Busines Wire, May 7, 1996.
David Downing, Oracle Webserver to Ship with Silicon Graphics challenge Systems, PR Newswire, Oct. 30, 1995.

*Primary Examiner*—Allen R. MacDonald
*Assistant Examiner*—Pedro R. Kanof
*Attorney, Agent, or Firm*—Standley & Gilcrest LLP

[57] ABSTRACT

A system for customizing content and presentation of content for computer users is disclosed. The system monitors and records a user's navigational choices to determine the user's needs and preferences for subsequent computer displays. Displays are customized in accordance with the user's needs and preferences. In a preferred embodiment of the present invention, an electronic marketing and shopping system accessible via the WWW is described. The shopping environment—including the opportunities presented to the shopper (content) and the appearance of the displays (presentation of content)—is customized according to the shopper's preferences. The functions of data collection and display customization are performed automatically by the electronic shopping system. To customize the environment, various attributes of Web pages or other displays provided by participating merchants are modified as they are accessed by shoppers using the system.

19 Claims, 3 Drawing Sheets

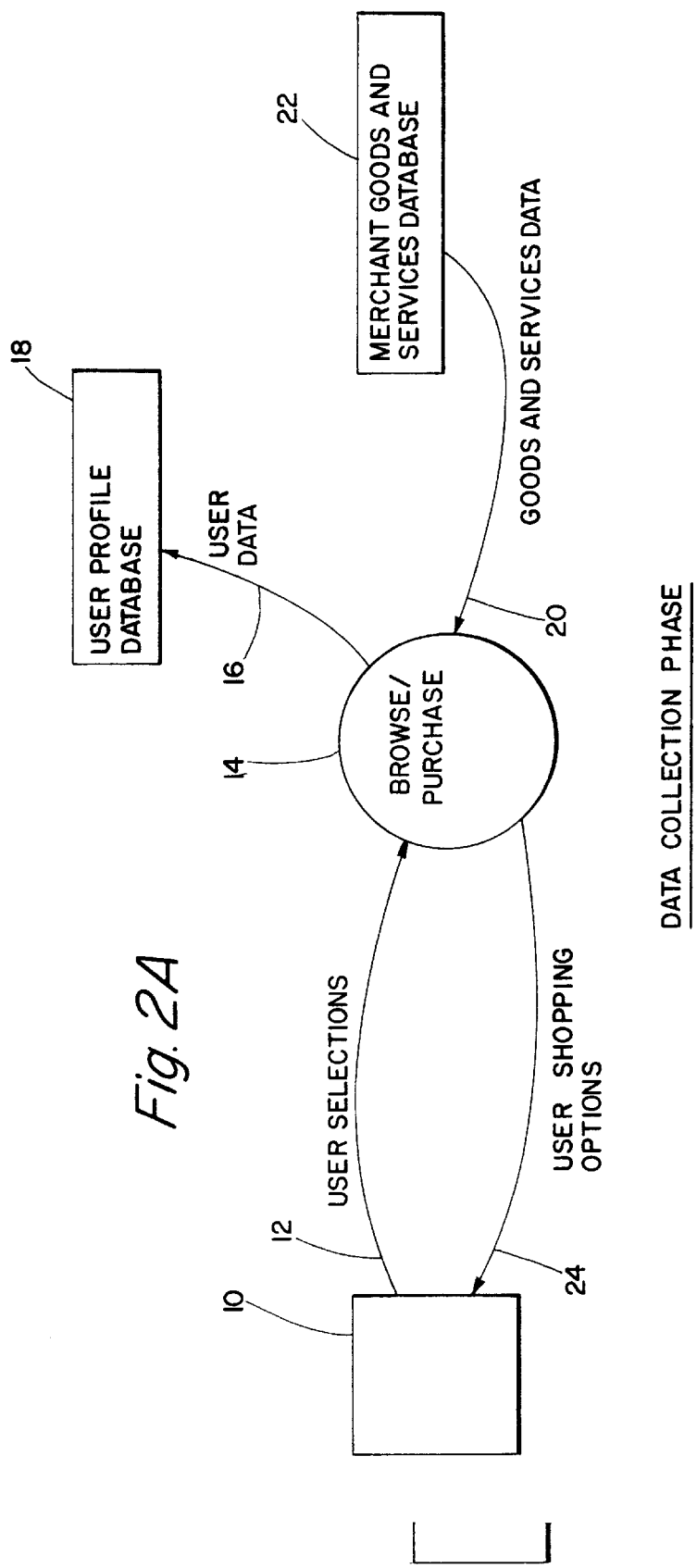

SYSTEM FOR CUSTOMIZING COMPUTER DISPLAYS IN ACCORDANCE WITH USER PREFERENCES

BACKGROUND AND SUMMARY OF THE INVENTION

The present invention relates generally to a system for customizing on-line service content and content presentation for individual computer users. Particularly, the present invention is a computer system that analyzes a computer user's on-line behavior to develop displays with content and display characteristics and elements tailored to the user's preferences and needs. In a preferred embodiment of the present invention, users shop in an on-line environment customized to meet their particular needs and preferences.

To many people, the Internet and the World Wide Web (WWW) represent a disorganized space. Many computer users wander from site to site hoping to find content that is of interest. Many uninteresting sites may be visited before a site with information of interest is located. Even sites related to one another by a common theme (e.g., shopping) may be difficult to navigate because so many of the sites do not have content that is of interest to the user.

One of the reasons that the task of navigating the Internet, specifically the WWW portion of the Internet, seems daunting is that there is no way to pull content from various locations or sites and organize it in a manner meaningful to the individual user. While some sites may be devoted to the task of organizing information from a variety of locations, the arrangement or organization is static and hence the same for all users. The needs and references of individual users are not taken into account so the content is displayed similarly for all users. There is no flexibility in determining content or in determining the presentation of the content.

The lack of flexibility in organizing content and presentation of content may extend across sites devoted to a particular theme. For example, on-line shopping environments today may allow computer users to purchase products and services from a variety of merchants, vendors, and manufacturers each of which may maintain an on-line site for computer users to visit. Despite the availability of products and services, users may have difficulty finding products of interest because the information is not presented in a meaningful way. The convenience of on-line shopping is impeded by a lack of flexibility in tailoring the experience to an individual's needs and preferences.

Electronic shopping allows computer users to purchase products and services without leaving their homes or offices. To computer users, on-line shopping may be viewed as a trip to a virtual store that offers many different products and services. These products and services are offered by a number of merchants, vendors, and manufacturers (collectively, merchants.) Typically, communications between shoppers and merchants are facilitated by an on-line information service that manages and maintains the electronic shopping system. Merchants decide what products and services they will offer and how they will be presented to shoppers within the constraints imposed by the electronic shopping system. Shoppers are provided with access software so they may connect to the network through which the electronic shopping services are offered.

Typically, shoppers browse the selections offered by the participating merchants. For example, shoppers may have the option of shopping by department so they may look at all products in a particular area. Shoppers may also have the option of specifying criteria regarding the type of product they would like to find such as the manufacturer, product features, or a price range. A host computer then searches for products that match the specified selection criteria. In addition, current electronic shopping systems allow shoppers to take advantage of promotions and offers made by the participating merchants.

In many instances, on-line shopping is conducted using a menu-driven rather than a graphics-based system. Shoppers find specific items or services by responding to a series of choices presented by the electronic shopping system. At the beginning of the shopping trip, each choice represents a broad category of products or services. The selection of one menu item results in the display of another menu that presents additional choices related to the previous selection. Eventually, by stepping through the levels of menus, shoppers may arrive at the desired site or location to browse or they may locate the desired product.

Alternatively, shoppers may search directly for the items or services they want. The ability to search allows shoppers to locate the items quickly, but it also means shoppers must know what they want. Direct searching presents limited browsing opportunities because shoppers may by-pass the menu structure and the search engine used by the system may not retrieve related items of interest.

Although menu-based shopping systems help shoppers to locate the products and services they desire, they limit the amount of control shoppers have over the environment and the experience. Typically, the menu items that are displayed are the same for all shoppers. Shoppers may be required to traverse through a number of menus that contain items of little interest before reaching the desired menu. Furthermore, shoppers spend most of their time reviewing text which may be of limited value in helping the shopper to navigate or learn about a particular product or service. In general, the shopping environment is not tailored to suit individual shopper preferences. Even if the environment may be tailored, generally only menu items are varied. The rest of the display usually remains the same for all shoppers. Furthermore, menu items may be varied only for specific stores rather than for the entire shopping trip. Finally, because menu-based systems are text-based, they generally make little use of graphics and color.

The inability to customize the shopping environment and related opportunities unnecessarily burdens both shoppers and merchants. Shoppers may be inconvenienced because they have difficulty locating the products and services they want or because they must traverse or navigate through screens and displays that are of little interest before reaching the desired location. Merchants are also burdened by the approach because they may lose customers who are unable to locate their products or services or because shoppers never have an opportunity to discover or learn about the merchant's products and services. Furthermore, even if shoppers are able to locate the merchant's product or service, they may leave the site without making a purchase because the merchant is unable to present the product or service in a manner that the individual shoppers find attractive and pleasing.

The present invention recognizes that the marketing and purchasing of products and services is actually integrated. Shoppers who find on-line shopping to be a pleasant experience and who are able to locate what they want or need quickly and easily may be more likely to make purchases. The present invention meets the needs and preferences of individual shoppers because it allows the shopping environment and experience to be customized or tailored for each shopper.

The present invention is a sophisticated electronic system that monitors and records an on-line user's navigation choices, content preferences, shopping purchases, etc. The present invention combines this knowledge of the user's on-line behavior with known information about the user's age, gender, and other personal details to arrive at an electronic profile of the user. The electronic system then causes the user's environment and related options to be customized based on the monitored preferences. The system uses the recorded user profile data to select specific information retrieval opportunities and modify displays for the user. Users benefit because the system responds to the individual's needs and preferences. Merchants and other content providers benefit because the users who are directed toward their products or services have already expressed an interest in the offerings and are more likely to find the display for the offerings to be attractive.

The lack of flexibility in determining content and in determining the presentation of content is general to on-line information services. In general, content and presentation of content are not tailored to individuals' needs and preferences even when users are navigating through sites related by a common theme such as investing money, weather information, or recent political events. Therefore, the system and method of the present invention may be applied to a number of areas, such as those listed above, in which the tailoring of content and presentation of content to an individual user will enhance an on-line service user's experience. The present invention may be used to analyze users' behavior generally while navigating an on-line service in order to tailor content and presentation of content to each user's specific interests. The advantages of the present invention are explained further by the accompanying drawings and detail description.

BRIEF DESCRIPTION OF THE DRAWINGS

FIGS. 2A and 2B are data flow diagrams for a preferred embodiment of the present invention.

DETAIL DESCRIPTION OF PREFERRED EMBODIMENT(S)

The present invention is a sophisticated computer system and method for analyzing a computer user's past navigational history to determine needs and preferences so that subsequent computer displays may be customized in accordance with the user's needs and preferences. The processes of determining content and content presentation are separated so that the layout of the computer displays is completed independently of content selection Using this approach, content may change frequently without affecting determination of the layout. In an alternative embodiment, the processes of determining content and presentation of content may be combined.

In a preferred embodiment of the present invention, a sophisticated computer system facilitates communication between shoppers and merchants. The system is comprised of a collection of computer application programs hosted on different computers that are interconnected by an infrastructure that provides communications among the participating entities. Preferably, the infrastructure and communications between the entities are facilitated, in part, by an on-line service such as the CompuServe® Information Service.

Using the present invention in a preferred embodiment, merchants may make their products and services available to on-line shoppers via a graphics-based system. Shoppers traverse the electronic shopping service by making selections from displays or screens that present shopping options which may be represented by icons or selectable screen regions as indicated by buttons (e.g., rectangular, round, or square). Some displays may consist of general topics, categories, or areas of interest (e.g., sports, electronics, finances) from which shoppers may make selections. Additional displays may have options (as represented by icons or buttons) directed toward a group of merchants who offer products and services relating to specific topics, categories, or areas of interest. Finally, some displays may be merchant specific such that all options (as represented by icons or buttons) relate to specific products and services from a particular merchant (i.e., a merchant's site). Shoppers may browse the offerings of a variety of merchants and if desired, make purchases.

Both shoppers and merchants participate in the system by subscribing to or establishing an account with the on-line service. In establishing an account, the on-line service provider issues to the subscriber (whether a shopper or a merchant) a user identifier (ID) and password for accessing the service. Merchants subscribe to the service so that they may upload information needed by the on-line service to facilitate their participation in the shopping system and so the on-line service may direct shoppers to the merchants' electronic shopping sites. Shoppers subscribe to the service so that they may browse the merchants' electronic shopping sites and make purchases, if desired.

Figure 1:
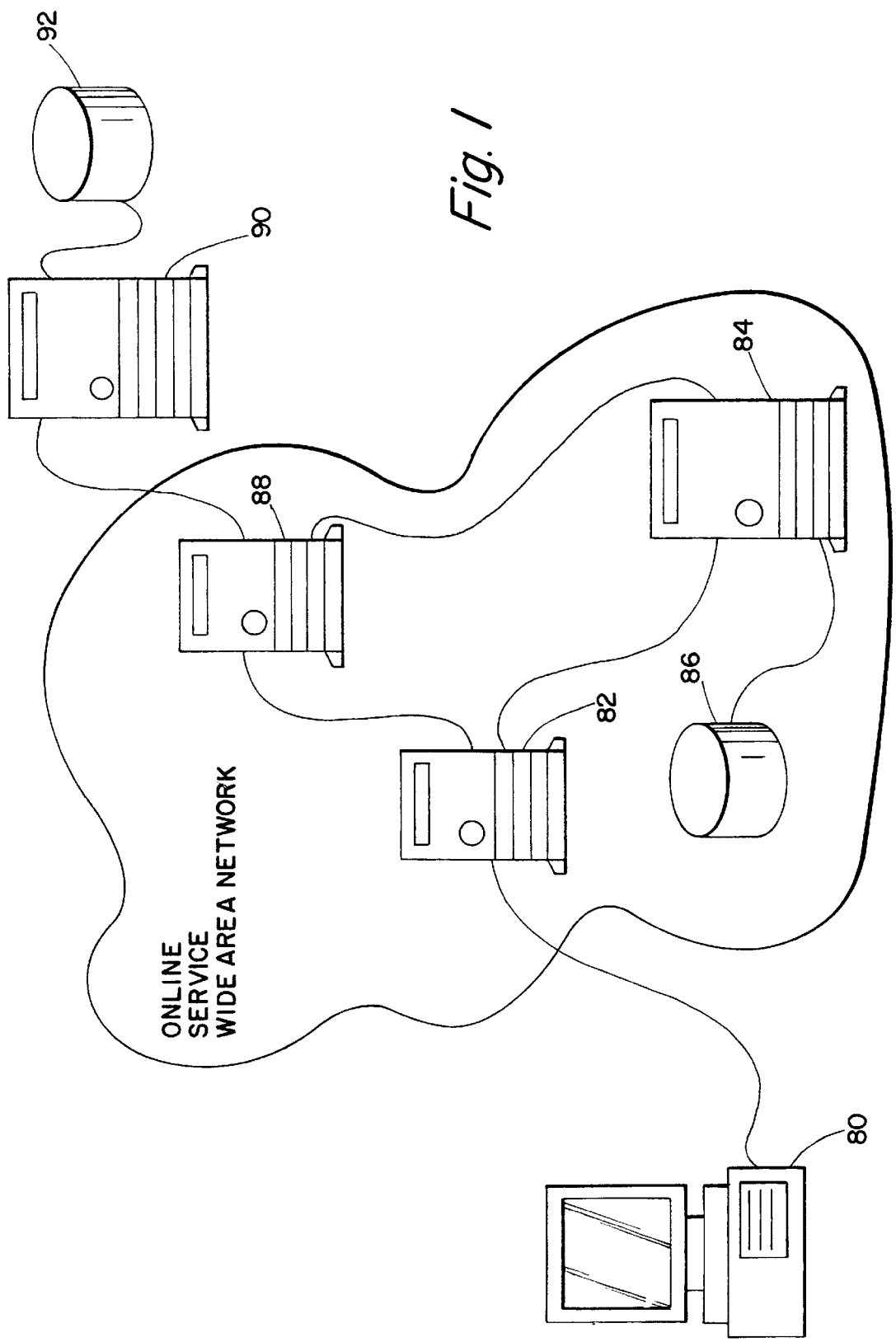
FIG. 1 is a system organization diagram for a preferred embodiment of the present invention.

Referring now to FIG. 1, a system organization for a preferred embodiment of the present invention is shown. Communications between a shopper's computer 80 and a merchant's computer 90 are accomplished via an on-line service comprising a wide area network that consists of network node computers 82, 88 and host computers 84. The network node computers 82, 88 manage network traffic such as communications between the shopper's computer 80 and the merchant's computer 90. Host computers, with which subscribers to the on-line service communicate, run application programs providing specialized services such as preferred embodiment of the present invention configured as a shopping manager 84. Specifically, the electronic shopping manager sends display information to the shopper's computer 80. Information about the shopper's selection is communicated back to the electronic shopping manager so additional display information may forwarded to the shopper's computer.

The shopper's computer 80 may be equipped with special communications software (such as the CompuServe® Information Manager for Windows®) provided by the on-line service to connect to, navigate, and make purchases through the electronic shopping environment. In an alternative embodiment, the shopper's computer 80 may be equipped with a WWW browser that allows the shopper to connect to the shopping service of the present invention via the Internet. In either case, the software on the shopper's computer 80 manages the display of information to the shopper and communicates the shopper's selections back to the electronic shopping manager 84 so that additional display information may be presented to the shopper. Whether the communication path from the shopper's computer 80 is established via the special communications software or the Web browser, preferably, the shopper connects to the on-line service via a network node 82 responsible for routing communications through the wide area network. The connection to the network node may be established via a modem or another means such as a cable connection.

Preferably, communications between the shopper's computer 80, electronic shopping manager 84, and the merchant's computer 90 are accomplished using an application-level protocol or interface (API). The API defines conventions for sending messages between the participating entities. For example, for shoppers using a Web browser to access the shopping service, communications with the electronic shopping manager 84 may be accomplished using the HyperText Transfer Protocol (HTTP) of the WWW. Messages from the electronic shopping manager 84 to the shopper's computer 80 contain information about the available shopping options and how they, preferably, are presented to the shopper. Messages from the shopper's computer 80 to the electronic shopping manager 84 contain information about the shopper's selections.

The merchant computer 90 may have access to a database 92 describing the products and services available from the merchant. Information regarding the merchant and the merchant's products and services may be communicated to the electronic shopping manager and preferably, is stored in a shopping database 86 to which the electronic shopping manager host computer 84 has access. Information regarding individual shoppers may also be stored in the shopping database 86 to which the electronic shopping manager host computer 84 has access. Alternatively, all merchant data may be stored remotely at the various merchant sites. The electronic shopping manager customizes shopping opportunities and related displays by analyzing the available shopper and merchant data. With access to information regarding the two participants in the shopping transaction (shopper and merchant), the present invention configured as an electronic shopping manager is able to meet the needs of both the shopper and the merchant. The shopper is presented with the opportunity to view and purchase that merchandise that is most likely to be of interest. The merchant's products and services are directed toward those shoppers who have, either directly or indirectly, expressed an interest in them.

Messages that are transmitted between the shopper's computer 90 and electronic shopping manager host computer 84 are assembled into Protocol Data Units (PDUs) that conform to the specifications for the protocol in use. A PDU contains data packaged in a structured format that both the sending and receiving applications understand. The sending application assembles the data into a PDU while the receiving application disassembles or decodes the PDU. For some protocols, the format may be very succinct so that the amount of data transmitted through the network is reduced. The types of identifiers and data contained in the PDU depend on the protocol by which the shopper's computer and the host computer are communicating.

Operations to accomplish a customized electronic shopping environment in accordance with the present invention may occur in two principle phases. In the first phase, data regarding the shopper's preferences are collected. Raw data relating to the electronic shopping options, such as specific sites and specific products selected by the shopper, entry and exit times for the sites, number of visits to the sites, etc., are recorded and processed to create a shopping profile for the shopper. Raw data may then be processed to create a preference profile for the shopper. The profile may also include personal data or characteristics (e.g., age, address, hobbies) regarding the shopper as provided by the shopper when subscribing to the service. Following the data collection phase is the display customization phase. During the display customization phase, displays with content regarding (1) general merchant information or options and/or (2) specific merchant product and service information or options are customized to conform to the shopper's preferences as indicated in the shopper's profile. A predictive model is applied to the profile data to select display characteristics and elements—such as the nature of items selected for the shopper, similarities to products recently purchased, icon or button locations, colors for background, icons/buttons, and text, fonts, etc.—for generating a display that is likely to reflect the shopper's preferences. The items that appear on the display (as represented by icons or buttons) may relate to a general topic, category, or area of interest (e.g., casual clothiers, camping equipment.) Items on a display may also relate generally to a group of merchants (e.g., ABC Co. Clothing, XYZ Camping Warehouse.) Finally, items may be merchant specific (e.g., ABC hiking boots, ABC jackets.) Display attributes for individual items (i.e., item graphics) may also be variable. Some icons or buttons (i.e., items) may be large or small and rectangular, square, or round. Some items may have associated text. Finally, an icon or button may contain a different picture depending on a user's preferences (e.g., store logo, product picture, product symbol.) In other words, several different pictures may be used to represent the same pair of hiking boots. Data collection may continue during the display customization phase so that accurate profile data are supplied to the predictive model.

Referring now to FIG. 2A, details of the data collection phase are revealed in a data flow diagram. The diagram illustrates the flow of data between, as well as the processes and functions of, the user and the electronic shopping manager. The phase begins when the user (shopper) 10 accesses the system and begins to browse by making selections 12. Displays from which the user 10 may make selections are developed by the Browse/Purchase process 14 of the electronic shopping manager. In some instances, the Browse/Purchase process may access a database containing information about specific products and services offered by merchants 22. Initially, the user may be given the opportunity to select from a list of options arranged according to general topics, categories, or areas of interest such as clothing, home, electronics, etc. Subsequent displays as developed by the Browse/Purchase process 14 of the electronic shopping manager may present additional options relating to the selected topic. For example, after selecting "electronics," the user may be presented with a display with options for traversing directly to one of four electronics merchant sites. Alternatively, the user may traverse directly to a specific merchant's site by entering an identifier (e.g., name or product) associated with a merchant.

In order to determine what preferences a particular shopper may have, the Browse/Purchase process of the electronic shopping manager processes the user selection data 12 to develop preference profile data as the user navigates through the shopping environment. For each store visit, the following data may be collected:

the store visited, time of visit, length of visit, merchandise viewed by shopper, and merchandise purchased by shopper.

In addition, for each store, the system may record:

the frequency of visits, the order in which the store is visited (store visit sequence), and the order in which individual product descriptions are visited.

Profile data for the shopper (i.e., user data) 16 is stored in a User Profile Database 18. Profile data may also include personal data and details (e.g., age, sex) provided by the shopper when joining or subscribing to the service. This personal information may also be stored in the User Profile Database 18. Information regarding products and services 20 retrieved from the Merchant Products and Services Database 22 is analyzed by the Browse/Purchase process 14 in conjunction with the user data 16 to determine what opportunities and related displays (shopping options 24) to present to the user. Shopping options 24 are presented to the user 10 who responds by making additional selections 12 that are then analyzed to create user data 16 that is recorded in the User Profile Database 18. The newly acquired user data is then analyzed by the Browse/Purchase process 14, along with the products and services data 20, to create subsequent shopping options and related displays 24 for the user 10.

The process of collecting the data is unobtrusive and incidental to the process of navigating through various sites whether general or specific to a merchant. Shoppers may initially set some display preferences such as button bar items and locations, background and foreground colors for displays, and sounds to be played when certain events occur. This setting information may be recorded and used in subsequent displays. Navigational inputs—the text and the mouse clicks that the shopper enters while navigating—are also collected. The navigational inputs (i.e., user selections 12) indicate which sites the shoppers like to visit and which products are of interest to the shoppers. Shoppers may express a direct interest in a product by asking to view it or by purchasing it. The navigational inputs are unique to each shopper and are unique for each shopping session. As shoppers navigate through various sites, they build unique identities for themselves because no two shoppers are likely to both set the same display preferences and take the same paths (i.e., make the same user selections) while shopping.

Figure 2B:
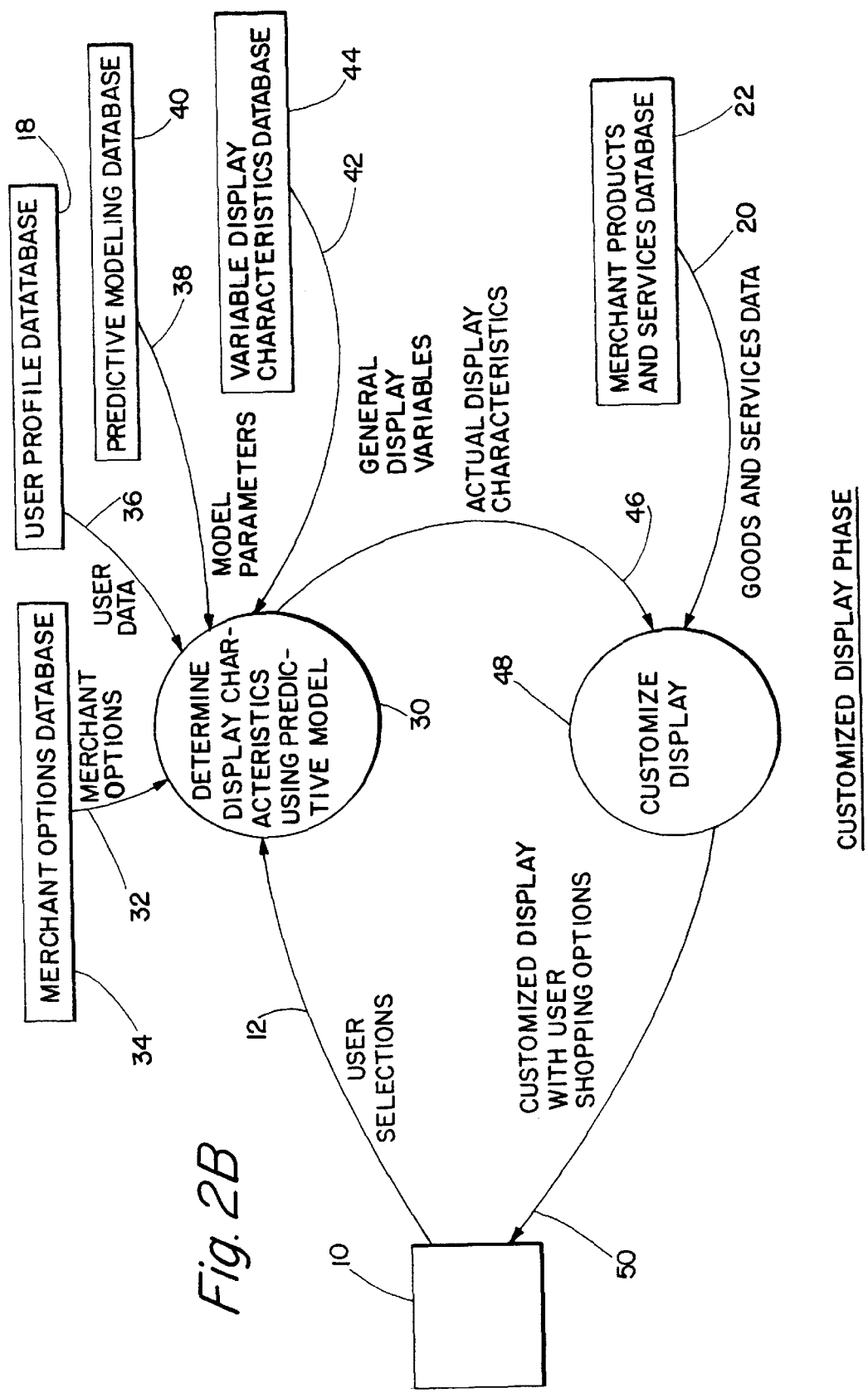

Referring to FIG. 2B, details of the process for creating displays customized according to the user's preferences are provided. As shown in FIG. 2B, the user 10 makes selections 12 while navigating various shopping sites. Both general topic/category/area of interest oriented and merchant specific selections may be made. Information regarding these selections is stored in the User Profile Database 18 so it may be used in determining the characteristics of the next display to be presented to the user. The user's profile data 36 (user data) is analyzed by a Determine Display Characteristics process 30 in conjunction with additional data from a variety of sources. First, data regarding participating merchants 32 is made available to the process. This data, which preferably is stored in a database 34, may include very general information about the merchant that is useful in understanding the profiles of participating merchants. For example, participating merchants may be asked to identify their products and services in relation to a limited range of options such as casual clothier, business clothier, sporting products establishment, real estate services, etc. The merchants may also provide pricing information and other profile information that may be helpful to shoppers in determining whether they would be interested in making purchases from a particular merchant. This general information provides an overview of the participating merchants and is useful in determining what topics/categories/areas of interest or opportunities may be presented to a shopper. In other words, this information may be used to determine what content the user may prefer to see. Specific information about each participating merchant (e.g., location, contact information) and the specific products and services offered by the merchants may be stored elsewhere.

Preferably, the general merchant data and specific product and service merchant data (i.e., merchant data) is separated for efficiency considerations. The separation of the data may result in performance improvements. The general merchant data may be scanned quickly to determine whether a particular merchant even offers products or services likely to be of interest to the user (e.g., as by review of the topics, categories, or areas of interest). Furthermore, the general merchant data may be scanned to determine quickly how many merchants offer products or services relating to a particular topic, category, or area of interest. This information may be useful in customizing a display as the overall presentation may differ depending on whether a large number of merchants meet the selection criteria or only one or two meet the selection criteria. Later on, specific product and service data may be retrieved from a second database as needed. Alternatively, all merchant data may be stored in the same database.

Model parameters 38—also used in determining the display characteristics and elements—indicate a user's preferences for a variety of items such as:

preferred number of options to view (as represented by items appearing on a single display)
  preferred option or item shape (e.g., round, rectangular, square, etc.)
  preferred topics/categories/areas of interest (e.g., casual clothing, camping equipment)
  preferred merchants (e.g., ABC Co. Clothing, XYZ Camping Warehouse)
  preferred merchant products and services (e.g., ABC hiking boots, XYZ tents)
  preferred background music and sounds (e.g., crickets)
  first, second, third color choices (e.g., khaki, green, blue)
  preferred background (e.g., stream and trees)

As may be apparent, these model parameters may be determined by analysis of the user data 36 that reflects the previous navigational choices made by the user. Careful review of the user's past choices (e.g., how long a user stayed at a particular site or viewed a product description, what purchases were made, etc.) may reveal the preferences noted above. Preferably, the model parameters for which individual user values are to be determined are stored in a predictive modeling database 40. The model parameters 38 may then be analyzed in relation to the general display variables 42 to determine the actual display variables.

General display variables 42, which are stored in a Variable Display Characteristics Database 44, indicate which characteristics or elements of the display may be varied (e.g., how many different opportunities may be presented on a particular display (i.e., total number of items that may be displayed) as well as how many colors may be used (e.g., for background, for borders, for individual items, etc.), where graphics may be displayed (e.g., in the center, on sides, etc.), what shape items have (e.g., round, square, rectangular, etc.)). The general display variables 42 are used to determine actual display characteristics 46 for a particular shopper.

The general display variables may assist in determining the presentation of content. For example, if a shopper has indicated a preference by selecting a general topic or category item labeled "Clothing" from a top-level display, the subsequent display may be comprised of five graphical items (e.g., rectangular graphical buttons) for five different causal clothing stores operated by five different merchants. The Determine Display Characteristics process 30 predicts what the shopper would like to see in the next display based on the model parameters and general display variables 42. The model chooses actual display characteristics 46 which meet the requirements of the general display variables and which are based on predictions regarding the shopper's display preferences for color, text, graphics, sounds, and surrounding images or context for presenting an item In addition, the model may predict the shopper's preferences for sites to visit and items that represent merchandise to view or purchase based on general information in the Merchant Options Database 34. For example, if, in the past, the shopper has indicated a preference for browsing causal clothing stores—perhaps by visiting one or two merchant sites of casual clothiers—the predictive model may determine that the actual display should contain options for accessing merchant sites of five casual clothing merchants. The two sites that the shopper has visited previously may be represented as well as three new sites that, based on information analyzed by the model, may also be of interest to the shopper. Alternatively, the display may present graphical items that represent sites or specific merchandise that may be of interest to shoppers looking for casual clothing. For example, in addition to the clothing options, an option for hiking boot information may be included in the display.

The process of determining display characteristics and elements is based on a predictive model unique to the present invention. The role of the predictive model is to evaluate a set of general, variable display characteristics and elements 42 to determine the actual display characteristics 46 for a given shopper, based on the known and perceived needs and preferences of the shopper. The predictive model may be used in determining content for the user and in determining the presentation content for the user. For example, a first shopper may be interested in reviewing a large number of options at one time while a second shopper may be interested in selecting from only two or three options at a time. In accordance with this knowledge, one of the selected variable display characteristics may be the number of options on a given display. Although the general display characteristics indicate that up to ten options may be presented on a display, the predictive model may suggest a different actual display characteristic for each display because the target user has, through past behavior, indicated a preference. For example, the model may suggest creating a customized display of seven options for the first shopper and a customized display of three options for the second shopper. In another example, although the general display characteristics may indicate up to four foreground colors may be used, the predictive model may suggest a different actual display characteristic for each display (e.g., two foreground colors for a first shopper and three foreground colors for a second shopper.)

Following determination by the predictive model of the actual display characteristics (i.e., determination of the presentation of content) 30—which are preferably independent of specific merchant data—a customized display is created (i.e., determination of content) 48. The customized display contains specific merchant information related to the actual display characteristics determined by the predictive model The Merchants Products and Services Database 22 may be queried to locate specific products and services display information 20 (i.e., content) consistent with the actual display characteristics (i.e., presentation of content) as suggested by the predictive model 30. For example, if the display is to contain options for accessing merchant sites of five casual clothing merchants, the Merchant Goods and Services Database 22 may be queried to retrieve five rectangular graphical buttons associated with specific merchants that may then appear on the display. Preferably, the processes of determining actual display characteristics 30 and customizing displays 48 are separated so that the modeling is not influenced by specific merchant data. Using this approach, information regarding specific merchants may be modified, deleted, or added without affecting the predictive model although information regarding the types and numbers of participating merchants may be updated in the Merchant Options Database 34. Furthermore, content related to other topics, categories, and areas of interest may be retrieved and adapted to the actual display characteristics.

Following presentation of the customized display 50 to the user 10, the user may make selections 12 that in turn influence options on subsequent displays. The ability to adapt the shopping displays according to the user's preferences and needs is unique to the present invention. The separation of the processes for determining presentation of content and selection of actual content makes the system and method of the present invention adaptable for use with virtually any on-line content. In a preferred embodiment of the present invention, using information from both the shopper and merchants, the electronic shopping system provides customized shopping experiences for shoppers and unique marketing opportunities for merchants.

The present invention makes on-line services and the Internet more valuable business resources because facilities for marketing and purchasing products and services are integrated into one system. Merchants' products and services are presented in a favorable manner based on the user's preferences as determined by the system. The present invention allows merchants to promote their products and services toward shoppers who have visited their electronic stores previously or who may have an interest in the merchant's products and services as determined by the shopper's expressed interest in related items. The ability to modify the electronic shopping experience based on individual shopper preference—an attribute unique to the present invention—means that shoppers may be given more meaningful choices while exploring the system. Shoppers benefit because they are able to quickly locate those products and services that they really want. Merchants benefit because their products and services may be promoted toward those shoppers with the greatest interest in their offerings. Furthermore, the products and services may be promoted in a manner that the individual shopper finds most attractive and pleasing. Shoppers who are given options specific to their needs and preferences and who find those options to be enticing may be more likely to purchase the available products and services.

The present invention may be used to customize the content and presentation of content as indicated by a computer user's preferences revealed through past navigational choices and knowledge of the user's personal details. Customization of content and presentation of content is accomplished using a predictive model that examines an individual user's past on-line behavior and personal characteristics to determine what content may be of interest and how it may be presented to meet the user's preferences. Because variable display characteristics are considered independently of content, general display layout may be determined first. After actual display characteristics have been determined, content as it relates to the context of the user's previous actions may be located to complete the display. The result is a computer display customized for both content and presentation of content.

What is claimed is:

1. An electronic shopping system comprising:
   user data relating to a computer user's navigational choices and personal characteristics;
   merchant data relating to a merchant's products or services;
   means for analyzing said user data and said merchant data to generate model parameters indicating said computer user's preferences for display of merchant data independent of content of said merchant data;
   variable display values independent of content of said merchant data set in accordance with said model parameters; and
   a customized computer display for presentation of said merchant data with characteristics and elements set in accordance with said variable display values independent of content of said merchant data.

2. The system of claim 1 wherein said model parameters are generated using a predictive model based on said computer user's navigational behavior and personal characteristics.

3. The system of claim 1 wherein said model parameters include said user's preferred number of shopping options, preferred topics of interest, preferred merchants, preferred products and services, preferred sounds, preferred background, and preferred colors.

4. The system of claim 1 wherein said user data includes values indicating sites visited, time of visits, length of visits, items viewed, items purchased, frequency of site visits, and sequence for sites visited.

5. The system of claim 1 wherein said variable display values include item graphics, item locations, item colors, a background graphic, a background color, and sounds.

6. The system of claim 5 wherein said item graphics relate to general topics, categories, or areas of interest or to specific merchants or specific merchant products and services.

7. The system of claim 1 wherein said merchant data is located at remote sites.

8. The system of claim 1 wherein said merchant data is located locally.

9. An electronic shopping system comprising:
   user data relating to a computer user's navigational choices and personal characteristics;
   merchant data relating to a merchant's products or services;
   general display variables independent of said merchant data indicating which elements of a computer display may be varied;
   actual display variables that conform to constraints imposed by said general display variables, at least one of said actual display variables selected in accordance with a user preference indicated by said user data; and
   means for selecting values for said actual display variables in accordance with preferences indicated by said user data and in accordance with merchant data.

10. The system of claim 9 wherein said means for selecting values is in accordance with a predictive model for determining a computer user's preferred display characteristics indicated by said user data.

11. The system of claim 9 wherein said user data includes values indicating sites visited, time of visits, length of visits, items viewed, items purchased, frequency of site visits, and sequence for sites visited.

12. The system of claim 9 wherein said general display variables include a total number of items that may be displayed, a plurality of item locations, a plurality of item colors, a plurality of item graphics, a plurality of background graphic, a plurality of background color, and a plurality of sounds.

13. The system of claim 9 wherein said actual display variables include item graphics, item locations, item colors, a background graphic, a background color, and sounds to be played.

14. The system of claim 13 wherein said item graphics relate to general topics, categories, or areas of interest or to specific merchants or specific merchant products and services.

15. A method for customizing a computer display, said method comprising the steps of:
   monitoring a computer user's navigational inputs;
   storing at least some information regarding said computer user's navigational inputs;
   monitoring a plurality of computer display characteristics that are independent of content;
   analyzing said information regarding said computer user's navigational inputs and personal characteristics to determine said computer user's preferences regarding said plurality of computer display characteristics;
   locating content relating to products and services offered by a plurality of merchants;
   determining which elements of a computer display independent of content may be varied; and
   selecting values for said variable computer display elements, said values selected in accordance with said computer user's preferences regarding said plurality of computer display characteristics and said content.

16. The system of claim 15 wherein said computer user's navigational inputs include values indicating sites visited, time of visits, length of visits, items viewed, items purchased, frequency of site visits, and sequence for sites visited.

17. The system of claim 15 wherein said variable computer display elements include item graphics, item locations, item colors, a background graphic, a background color, and sounds to be played.

18. The system of claim 15 wherein said computer user's navigational inputs include values indicating sites visited, time of visits, length of visits, items viewed, items purchased, frequency of site visits, and sequence for sites visited.

19. A method for customizing user displays from one user to another in a computer network, said method comprising the steps of:
   monitoring a first user's navigational inputs;
   storing at least some first user information regarding said first user's navigational inputs;
   analyzing said first user information to determine said first user's preferences for display characteristics and elements independent of content;
   monitoring a second user's navigational inputs;
   storing at least some second user information regarding said second user's navigational inputs;
   analyzing said second user information to determine said second user's preferences for display characteristics and elements independent of content;
   customizing a display seen by said first user to provide said first user's preferences for display characteristics and elements independent of content more prominently in said display;
   customizing a display seen by said second user to provide said second user's preferences for display characteristics and elements independent of content more prominently in said display; and
   wherein said first user's display is unique from said second user's display in the same computer network.

* * * * *